US010638528B2

(12) United States Patent
Kubota

(10) Patent No.: US 10,638,528 B2
(45) Date of Patent: Apr. 28, 2020

(54) COMMUNICATION APPARATUS, METHOD OF CONTROLLING COMMUNICATION APPARATUS, AND STORAGE MEDIUM, FOR ESTABLISHING COMMUNICATION LINK

(71) Applicant: CANON KABUSHIKI KAISHA, Tokyo (JP)

(72) Inventor: Tsutomu Kubota, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/006,797

(22) Filed: Jan. 26, 2016

(65) Prior Publication Data
US 2016/0241725 A1 Aug. 18, 2016

(30) Foreign Application Priority Data
Feb. 16, 2015 (JP) ................. 2015-027940

(51) Int. Cl.
*H04W 80/00* (2009.01)
*H04W 52/02* (2009.01)
(Continued)

(52) U.S. Cl.
CPC .......... *H04W 76/14* (2018.02); *H04W 76/10* (2018.02); *H04W 76/28* (2018.02); *H04N 1/00* (2013.01);
(Continued)

(58) Field of Classification Search
CPC ............. H04N 1/2166; H04N 1/00891; H04N 1/00896; H04N 21/43637; H04N 21/6405;
(Continued)

(56) References Cited

U.S. PATENT DOCUMENTS

| 5,727,136 A | 3/1998 | Kubota | 395/114 |
| 6,009,244 A | 12/1999 | Kubota | 395/114 |

(Continued)

FOREIGN PATENT DOCUMENTS

| JP | A 2012-138074 | 7/2012 |
| JP | A 2013-187734 | 9/2013 |

OTHER PUBLICATIONS

U.S. Appl. No. 62/074,062 of U.S PreGrant Publication No. 2016/0127600 (Beatty, filed Nov. 2, 2014).*

(Continued)

*Primary Examiner* — Juan M Guillermety
(74) *Attorney, Agent, or Firm* — Venable LLP

(57) ABSTRACT

An information processing apparatus generates a beacon packet including state information indicating an operational state of the self-apparatus, and periodically transmits the packet by a short-range wireless communication. A mobile terminal, when a data packet transmission request to the information processing apparatus occurs, detects the beacon packet transmitted from the information processing apparatus from signals received by the short-range wireless communication. When the mobile terminal detects the beacon packet, it controls the timing of initiating transmission of a data packet in accordance with the operational state of the information processing apparatus which the state information included in the beacon packet indicates.

28 Claims, 8 Drawing Sheets

(51) Int. Cl.
*H04N 1/00* (2006.01)
*H04W 76/14* (2018.01)
*H04W 76/10* (2018.01)
*H04W 76/28* (2018.01)
*H04W 84/18* (2009.01)

(52) U.S. Cl.
CPC ............ *H04W 52/02* (2013.01); *H04W 80/00* (2013.01); *H04W 84/18* (2013.01)

(58) Field of Classification Search
CPC ............. G06K 15/406; H04W 76/023; H04W 76/048; H04W 76/02; H04W 84/18; H04W 4/80; G10H 2240/321; G05B 2219/25186; G08B 21/0277; H04B 2201/71346; H04M 2017/2531; H04M 17/305; H04M 2250/02; H04M 2203/205; H04M 2215/7813; H01Q 1/2291; H04Q 2209/43; H04Q 1/2291; H04L 61/3075; H04L 9/3273; B01L 2300/023; A61M 2205/3584; A63F 2300/1031
USPC ................................................. 358/1.14, 1.15
See application file for complete search history.

(56) References Cited

U.S. PATENT DOCUMENTS

| | | | | |
|---|---|---|---|---|
| 7,389,431 | B2* | 6/2008 | Ohara ................... | G06F 1/3215 358/1.15 |
| 8,798,026 | B2* | 8/2014 | Horiguchi ......... | H04W 52/0222 370/345 |
| 9,485,734 | B2* | 11/2016 | Park ........................ | H04W 4/80 |
| 2006/0221927 | A1* | 10/2006 | Yamada ................ | H04W 48/12 370/345 |
| 2012/0127523 | A1* | 5/2012 | Terashita .............. | G06F 3/1203 358/1.15 |
| 2012/0133971 | A1* | 5/2012 | Park ................... | H04N 1/00896 358/1.15 |
| 2012/0195387 | A1* | 8/2012 | Masuda ................. | H04W 8/005 375/259 |
| 2012/0327920 | A1* | 12/2012 | Xhafa ............... | H04W 74/0808 370/338 |
| 2013/0155931 | A1* | 6/2013 | Prajapati ............... | H04W 16/04 370/311 |
| 2014/0146336 | A1* | 5/2014 | Yagi ................... | H04N 1/00891 358/1.13 |
| 2014/0321321 | A1* | 10/2014 | Knaappila ............... | H04W 4/80 370/254 |
| 2014/0328210 | A1* | 11/2014 | Knaappila ............... | H04W 4/80 370/254 |
| 2014/0355058 | A1* | 12/2014 | Matsuhara ......... | H04N 1/00896 358/1.15 |
| 2015/0026580 | A1* | 1/2015 | Kang ................... | H04W 76/023 715/728 |
| 2015/0031302 | A1* | 1/2015 | Kawasaki ............ | H04W 4/008 455/41.2 |
| 2016/0127600 | A1* | 5/2016 | Beatty ................... | H04W 4/008 358/1.15 |
| 2016/0182755 | A1* | 6/2016 | Saito .................. | H04N 1/00896 358/1.14 |
| 2016/0278006 | A1* | 9/2016 | Lee ....................... | H04W 76/02 |
| 2017/0134609 | A1* | 5/2017 | Park ................... | H04N 1/00278 |
| 2017/0223615 | A1* | 8/2017 | Lee ....................... | H04W 76/10 |

OTHER PUBLICATIONS

Precise Energy Modeling for the Bluetooth Low Energy Protocol; Philipp Kindt, Daniel Yunge, Robert Diemer and Samarjit Chakraborty; Section 2.2.2 (pp. 5-6), Section 4.2.3 (p. 15); Mar. 13, 2014 https://arxiv.org/pdf/1403.2919.pdf (Year: 2014).*

* cited by examiner

COMMUNICATION APPARATUS, METHOD OF CONTROLLING COMMUNICATION APPARATUS, AND STORAGE MEDIUM, FOR ESTABLISHING COMMUNICATION LINK

BACKGROUND OF THE INVENTION

Field of the Invention

The present invention relates to a communication apparatus, a method of controlling a communication apparatus, and a storage medium.

Description of the Related Art

In recent years, accompanying the spread of mobile terminal devices such as mobile telephones and smart phones, systems capable of causing an image processing apparatus such as a printer or a multi function peripheral to execute printing from a mobile terminal device by wireless communication in place of wired communication have been proposed. For example, in Japanese Patent Laid-Open No. 2012-138074, a system in which a mobile terminal device transmits a document data file by a wireless LAN communication to a server apparatus, and a multi function peripheral obtains print data corresponding to the document data file from the server apparatus and executes printing the obtained print data is disclosed. When this multi function peripheral detects a mobile terminal device present in its periphery by a short-range wireless communication, the multifunction peripheral obtains print data corresponding to the mobile terminal device from the server apparatus and executes printing the obtained print data.

Bluetooth®, for example, and Bluetooth Low Energy, which is an extension standard thereof, are communication standards for short-range wireless communication as described above. In Bluetooth Low Energy, compared to Bluetooth, significant power saving is made possible. Also, as a technique for reducing power consumption in an apparatus that performs transmission and reception of data by a wireless communication according to Bluetooth, for example, a technique for suppressing power consumption by putting an apparatus in a power saving mode in an interval in which data communication is not performed is disclosed in Japanese Patent Laid-Open No. 2013-187734.

There are cases in which, in a mobile terminal device, communication with an external apparatus is performed in the background unless a user disconnects the communication intentionally even in an interval in which the device is in a power saving state (for example, a sleep state). The mobile terminal device maintains a state in which communication with the external apparatus is possible even in the power saving state by periodically transmitting an advertisement packet (a beacon signal), if operating in accordance with Bluetooth Low Energy, for example. In general, mobile terminal devices are designed to be able to establish a communication link with an external apparatus in a short time in cases where a communication request (a connection request) is received from the external apparatus in accordance with such as beacon signal in the power saving state.

Meanwhile, in order to make it possible to provide a service in an information processing apparatus such as an image processing apparatus to an external apparatus such as a mobile terminal device, it is possible to continue to transmit beacon signals as described above periodically during operation in a power saving state. However, in such an information processing apparatus, the time required to recover (specifically, to complete transition to a normal operational state) from a power saving state when a connection request is received from a mobile terminal device may become longer than for the mobile terminal device depending on its design. As a result, a delay may occur in the timing at which the information processing apparatus transmits a response to the connection request from the mobile terminal device, and a communication error may occur.

SUMMARY OF THE INVENTION

The present invention was conceived in view of the above described issues. The present invention provides a technique for preventing an occurrence of a communication error in a case where a delay occurs in a response to a connection request from the mobile terminal device depending on the operational state in an information processing apparatus capable of wireless communication with a mobile terminal device.

According to one aspect of the present invention, there is provided a communication apparatus, comprising: a reception unit configured to receive a packet transmitted from an external apparatus; a transmission unit configured to transmit a connection request to the external apparatus and to transmit data to the external apparatus after transmitting the connection request; and a decision unit configured to, based on information included in the packet received by the reception unit, decide a transmission interval between the connection request and the data.

According to another aspect of the present invention, there is provided a method of controlling a communication apparatus, comprising: receiving a packet transmitted from an external apparatus; transmitting a connection request to the external apparatus and transmitting data to the external apparatus after transmitting the connection request; and deciding a transmission interval between the connection request and the data, based on information included in the packet received by the reception unit.

According to still another aspect of the present invention, there is provided a non-transitory computer-readable storage medium storing a computer program for causing a computer to execute a method of controlling a communication apparatus, comprising: receiving a packet transmitted from an external apparatus; transmitting a connection request to the external apparatus and transmitting data to the external apparatus after transmitting the connection request; and deciding a transmission interval between the connection request and the data, based on information included in the packet received by the reception unit.

By the present invention, an occurrence of a communication error can be prevented in a case where a delay occurs in a response to a connection request from a mobile terminal device depending on the operational state in an information processing apparatus capable of wireless communication with the mobile terminal device.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<Information Processing Apparatus Configuration>

Figure 1:
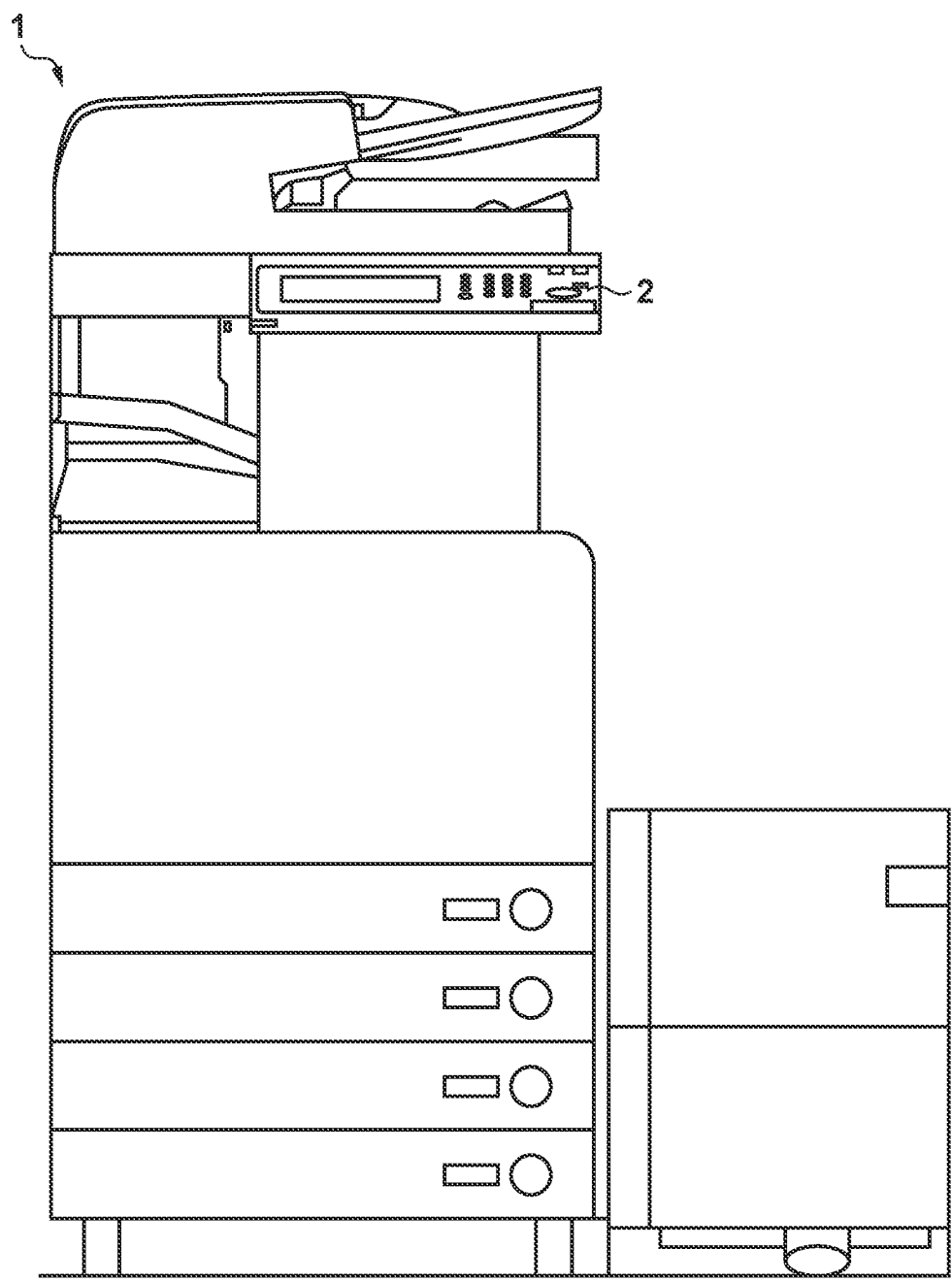
FIG. 1 is a perspective view for illustrating an example configuration of an information processing apparatus.
Figure 2:
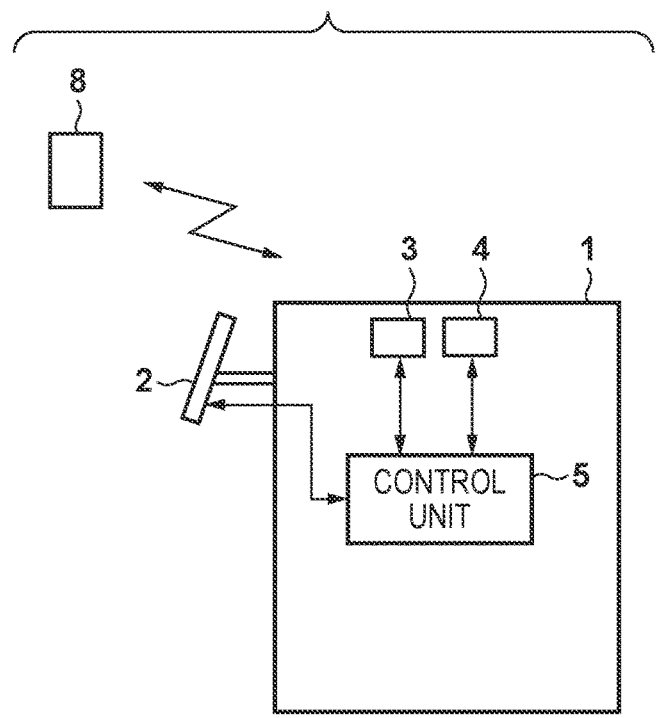
FIG. 2 is a block diagram for illustrating an example configuration of a communication system.

FIG. 1 is a perspective view for illustrating an example configuration of an information processing apparatus according to an embodiment, and FIG. 2 is a block diagram for illustrating an example configuration of a communication system according to the present embodiment. In the present embodiment, explanation will be given for an information processing apparatus 1 being a multi function peripheral comprising various functions such as a copy function, a scan function, a FAX function, and a print function. However, the information processing apparatus 1 may be an image processing apparatus such as, for example, an image forming apparatus (a printer), an image reading apparatus (scanner), or the like.

The communication system according to the present embodiment comprises the information processing apparatus 1, and a mobile terminal 21 capable of communication with the information processing apparatus 1. The information processing apparatus 1 is capable of performing wireless communication with the mobile terminal 21 in accordance with a Bluetooth (hereinafter referred to as "BT") standard. The BT standard is one communication standard for short-range wireless communication. Note that the information processing apparatus 1 can also perform wireless communication with the mobile terminal 21 in accordance with a wireless LAN standard. In the information processing apparatus 1, a control unit 5 controls operation of an operation panel 2, a wireless LAN communication unit 3, and a BT communication unit 4. A user of the mobile terminal 21 can use the information processing apparatus 1 by wireless communication with the information processing apparatus 1. The mobile terminal 21, for example, can cause the information processing apparatus 1 to execute various processes such as print processing by a BT communication which is one example of a short-range wireless communication.

Figure 3:
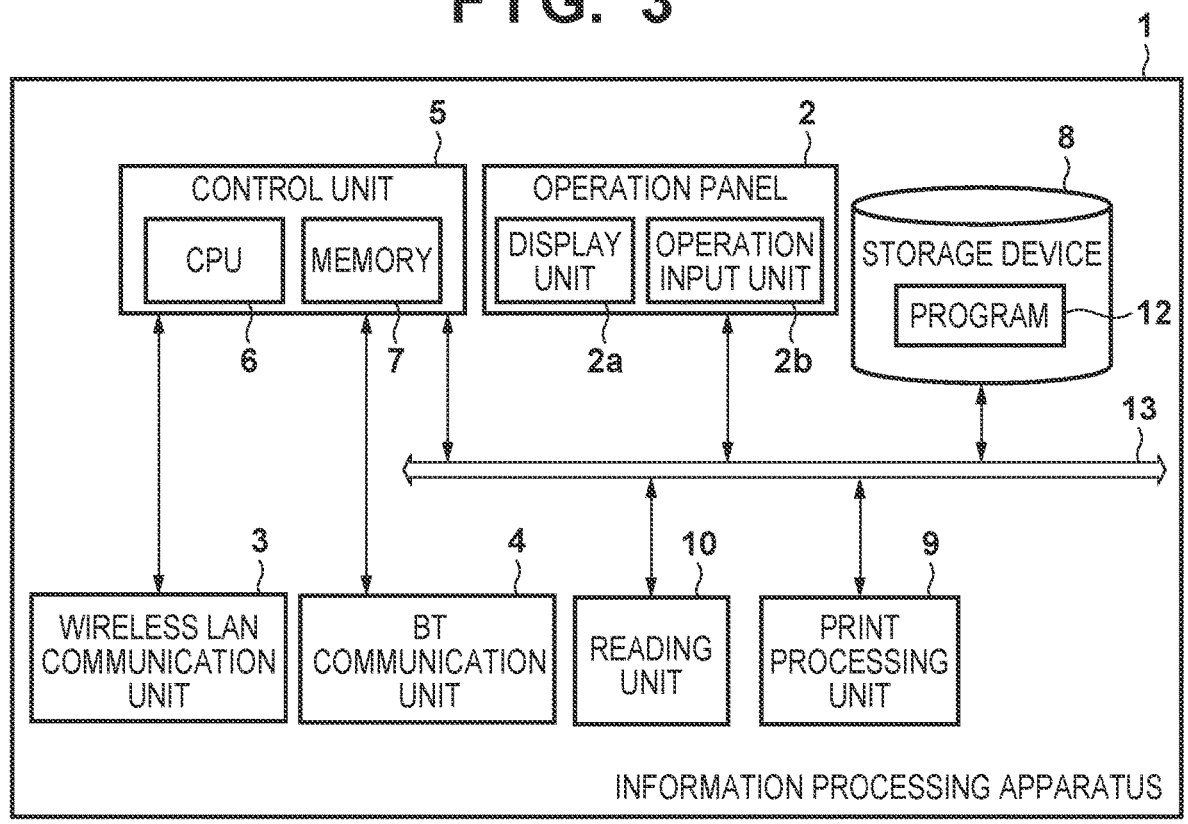
FIG. 3 is a block diagram for illustrating an example of a hardware configuration of the information processing apparatus.

FIG. 3 is a block diagram for showing an example of a hardware configuration of the information processing apparatus 1. The information processing apparatus 1 comprises the operation panel 2, the wireless LAN communication unit 3, the BT communication unit 4, the control unit 5, a storage device 8, a print processing unit 9, and a reading unit 10. The operation panel 2, the control unit 5, the storage device 8, the print processing unit 9, and the reading unit 10 are connected via a system bus 13, and each device is capable of communication with each other via the system bus 13. Also, the wireless LAN communication unit 3 and the BT communication unit 4 are capable of communicating with the control unit 5 via respective dedicated interfaces.

The control unit 5 comprises a CPU 6 and a memory 7, and controls operation of each device of the information processing apparatus 1. The CPU 6 realizes various processing that is described later by reading and executing a program 12 stored in the storage device 8. In the memory 7 data is stored temporarily at a time of execution of the program 12 by the CPU 6, and the memory 7 is used as a work memory of the CPU 6. The storage device 8 is configured by a hard disk drive (HDD), for example, and the program 12, or the like, and various other information is stored therein.

The operation panel 2 comprises a display unit 2a and an operation input unit 2b. The display unit 2a is configured by a liquid crystal panel or the like and displays various information or operation screens in accordance with control of the CPU 6. The operation input unit 2b is configured by a touch panel or the like arranged on the display module 2a, and by detecting an operation of a user on an operation screen displayed on the display unit 2a, the operation input unit 2b accepts input of an instruction by the user.

The wireless LAN communication unit 3 performs a wireless communication in accordance with a wireless LAN standard with an external apparatus. The BT communication unit 4 performs a wireless communication (a BT communication) in accordance with a BT standard with an external apparatus. The information processing apparatus 1 (the CPU 6) can perform data input and output processing with an external apparatus by wireless communication by the wireless LAN communication unit 3 and the BT communication unit 4.

The print processing unit 9 outputs a printed material by executing print processing based on image data. The print processing unit 9 comprises an image forming unit for forming toner images (image) based on the image data, and a transfer unit for transferring toner images formed by the image forming unit to sheets which are fed one sheet at a time. Furthermore, the print processing unit 9 comprises a fixing unit for causing a transferred toner image to be fixed on a sheet, and a conveying mechanism for discharging a sheet (a printed material) on which an image is formed (printed) to the outside of the apparatus.

The reading unit 10 reads an image of an original, and generates image data. The reading unit 10 comprises a document feeder for feeding a plurality of originals placed on an original table one sheet at a time, and an image data outputting unit for converting an image of a read original into image data and outputting the image data.

(Information Processing Apparatus Operation Modes)

The information processing apparatus 1 has, as operation modes, a normal mode in which it can execute various processes (functions), and a power saving mode in which power consumption is less than in the normal mode. When the information processing apparatus 1 transitions from the normal mode into the power saving mode, it continues a power supply to the CPU 6, the wireless LAN communication unit 3, and the BT communication unit 4, but stops a power supply to other devices. Accordingly, the information processing apparatus 1 is capable of communication with an external apparatus such as the mobile terminal 21 even in a case where it is in the power saving mode.

When, via the wireless LAN communication unit 3 or the BT communication unit 4, the information processing apparatus 1 receives a communication request (a connection request) from an external apparatus in the power saving mode, it operates after transitioning (recovering) to the normal mode from the power saving mode. Also, if a fixed interval elapses in which the information processing apparatus 1 is not used by a user, for example, or if an instruction to transition to the power saving mode is input via the operation input unit 2b, the information processing apparatus 1 transitions from the normal mode to the power saving mode.

<Mobile Terminal Configuration>

Figure 4:
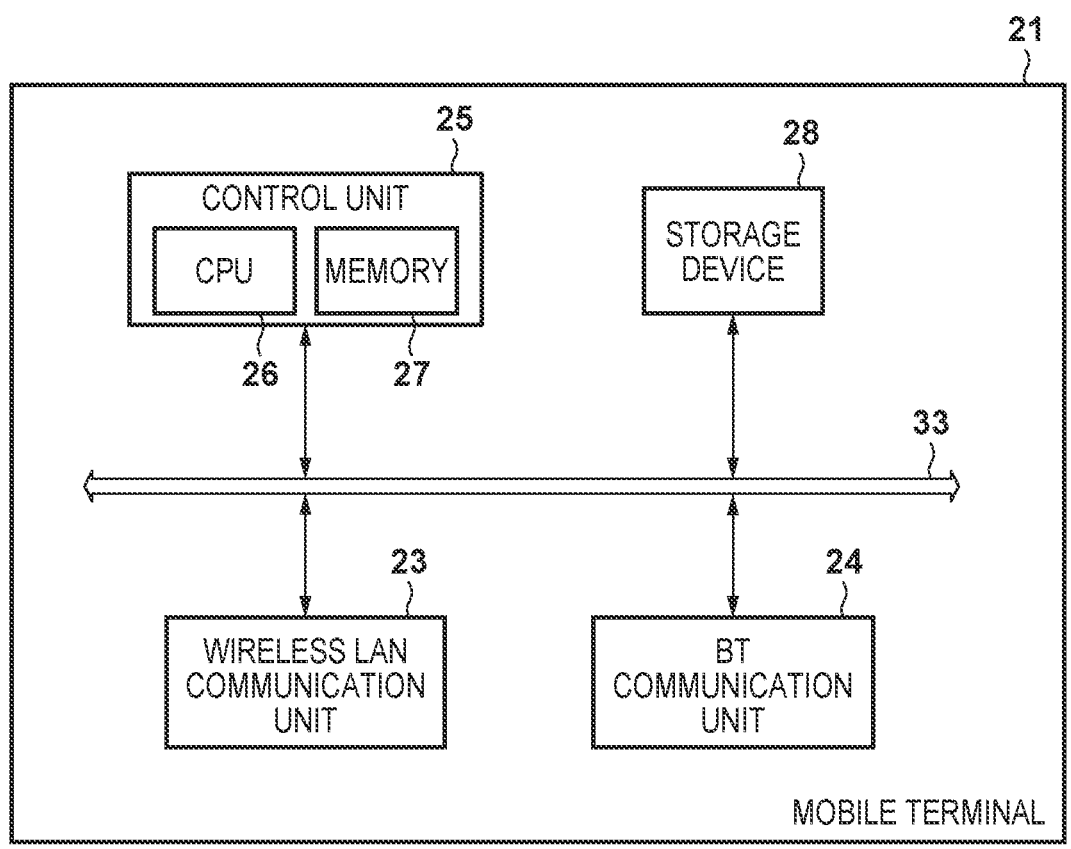
FIG. 4 is a block diagram for illustrating an example of a hardware configuration of a mobile terminal.

FIG. 4 is a view for illustrating an example of a hardware configuration of the mobile terminal 21. The mobile terminal 21 comprises a wireless LAN communication unit 23, a BT communication unit 24, a control unit 25, and a storage device 28, which are connected via a system bus 33. These devices can communicate with each other via the system bus 33. Note that, the mobile terminal 21 also comprises devices such as an operation panel, a battery, and a power source controller, although these are not illustrated in FIG. 4.

The control unit 25 comprises a CPU 26 and a memory 27, and controls operation of each device of the mobile terminal 21. The CPU 26 realizes various processing that is described later by reading and executing a program stored in the storage device 28. In the memory 27 data is stored temporarily at a time of execution of the program by the CPU 26, and the memory 27 is used as a work memory of the CPU 26. In the storage device 28, various information such as a program or image data is stored.

The wireless LAN communication unit 23 performs a wireless communication in accordance with a wireless LAN standard with an external apparatus. The BT communication unit 24 performs a wireless communication in accordance with a BT standard with an external apparatus. The mobile terminal 21 (the CPU 26) can perform data input and output processing with an external apparatus by wireless communication in accordance with the wireless LAN communication unit 23 and the BT communication unit 24.

<Communication Procedure Between Information Processing Apparatus and Mobile Terminal>

Figure 5:
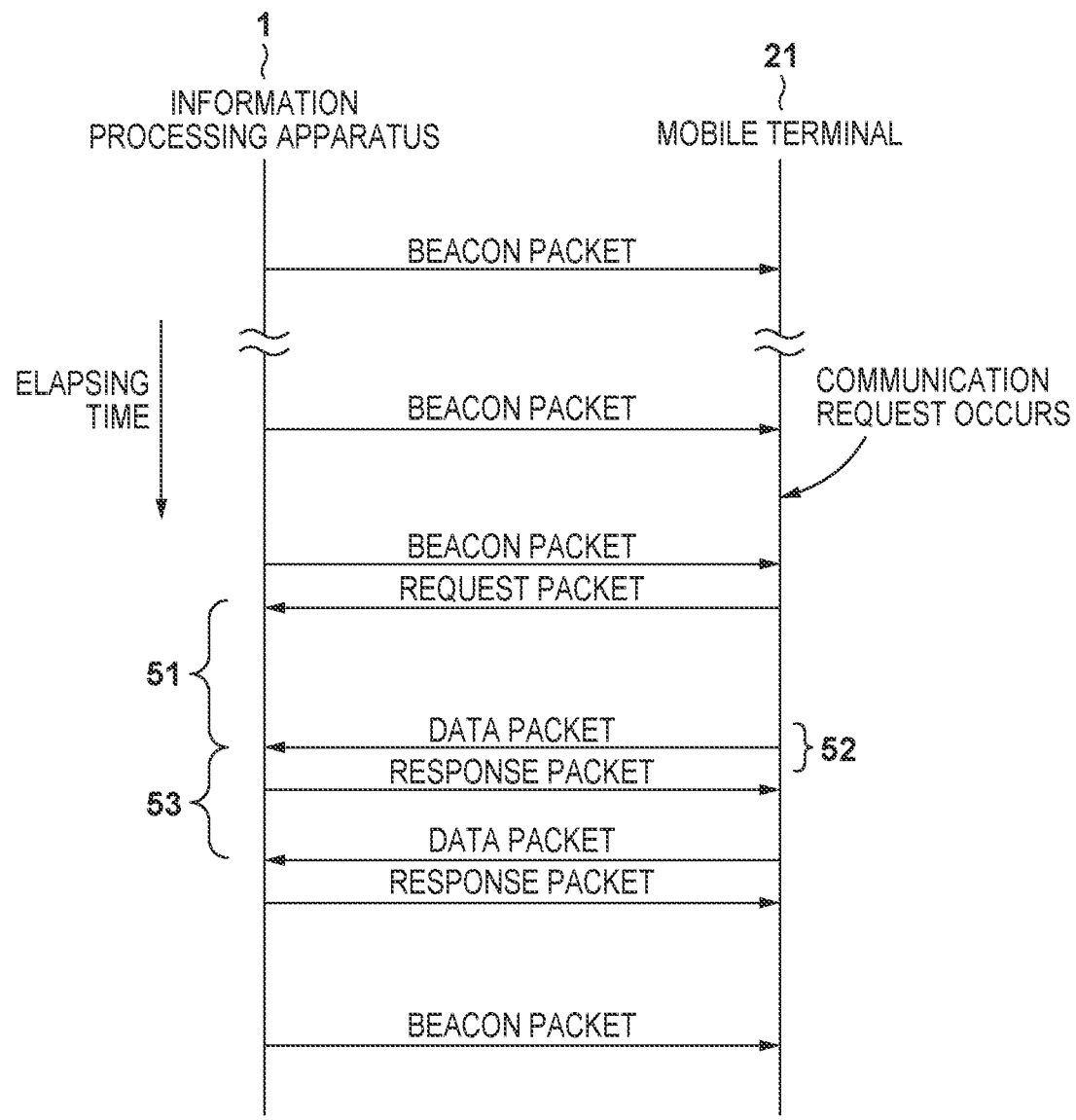
FIG. 5 is a sequence diagram for illustrating an example of a procedure for communication performed between the information processing apparatus and the mobile terminal.

FIG. 5 is a sequence diagram for illustrating an example of a procedure for communication performed between the information processing apparatus 1 and the mobile terminal 21. In the present embodiment, the information processing apparatus 1 and the mobile terminal 21 perform communication in accordance with a Bluetooth Low Energy standard which is a standard for performing communication having a lower power consumption than the Bluetooth standard and which is an extension standard of the Bluetooth standard. Also, the information processing apparatus 1 operates as a slave which is a side that is connected to from an external apparatus, and the mobile terminal 21 operates as a master which is a side that connects to an external apparatus (the information processing apparatus 1).

In the information processing apparatus 1, when operation as a slave is initiated, the CPU 6 instructs the BT communication unit 4 to transmit a beacon signal (a beacon packet) whose transmission target is an unspecified external apparatus periodically (in fixed intervals). The BT communication unit 4 initiates transmission of beacon packets in accordance with the instruction from the CPU 6. The beacon packet is transmitted in order to notify the existence of the information processing apparatus 1 to an external apparatus present in periphery of the information processing apparatus 1. An external apparatus that receives the beacon packet can establish a link for a BT communication with the information processing apparatus 1 by transmitting a communication request (a connection request) to the information processing apparatus 1.

In the mobile terminal 21, the CPU 26 instructs the BT communication unit 24 to initiate BT communication when a BT communication request (that is, a request for transmission of data packets to an external apparatus) occurs after activating a program in accordance with an operation by a user. The BT communication unit 24 performs a search for a beacon packet transmitted from an external apparatus which is a connection target (the information processing apparatus 1 here). The BT communication unit 24 transmits as a connection request to the information processing apparatus 1 a request packet including a communication setting when the beacon packet transmitted from the information processing apparatus 1 is detected.

In the request packet, information indicating a transmit-window-offset 51 and a transmit-window-size 52 is caused to be included as a communication setting indicating a timing of communication set by the mobile terminal 21 on the side of the master. When the request packet is received by the information processing apparatus 1, a link for BT communication between the information processing apparatus 1 and the mobile terminal 21 is established. The apparatus on the master side can set the timing for communication via the link established with the apparatus on the slave side, and can include a communication setting indicating the set timing in the request packet and transmit it to the apparatus on the slave side. With this, the apparatuses on the master side and the slave side perform communication via the established link at a timing according to the communication setting.

In the mobile terminal 21, the BT communication unit 24 initiates transmission of data packets to the information processing apparatus 1 via the established link when a time corresponding to the transmit-window-offset 51 elapses from when the request packet is transmitted. The BT communication unit 24 transmits data packets to the information processing apparatus 1 in accordance with the communication setting included in the request packet. Note that the BT communication unit 24 can transmit data packets in an interval corresponding to the transmit-window-size 52.

Meanwhile, in the information processing apparatus 1, at a timing according to the communication setting included in the received request packet, the BT communication unit 4 transmits a response packet as a response to a received data packet. The BT communication unit 4 transmits the response packet to the mobile terminal 21 at a timing determined by the transmit-window-offset 51 and the transmit-window-size 52 that the communication setting indicates. In this way, the information processing apparatus 1 (the BT communication unit 4) returns the response packet at a timing at which it is requested by the request packet from the mobile terminal 21.

When the BT communication unit 24 receives from the information processing apparatus 1 the response packet in relation to the transmitted data packet, the BT communication unit 24 retrieves data from the received response packet and outputs the data to the CPU 26. If the data to be transmitted further exists (specifically, transmission of a data packet is necessary), the CPU 26 outputs to the BT communication unit 24 the data to be transmitted, and instructs the BT communication unit 24 to transmit the data. The BT communication unit 24, in accordance with the instruction from the CPU 26, transmits to the information processing apparatus 1 a data packet including the data outputted from the CPU 26 at a transmission timing of the next data packet which is defined by a connection interval 53. Meanwhile, if data to be transmitted further does not exist (specifically, transmission of a data packet is not necessary), the CPU 26 causes the BT communication unit 24 to standby without performing any instruction so that a link for a BT communication is caused to be disconnected by a timeout.

Additionally, the foregoing parameter for deciding the communication timing is defined as follows in the Bluetooth Low Energy standard.

transmit-window-offset: a parameter that defines an offset time from when the request packet is transmitted until the data packet is transmitted.

transmit-window-size: a parameter that defines an interval in which a first data packet can be transmitted.

connection interval: a parameter that defines a data packet transmission time interval (more accurately a hopping period).

<Data Packet Transmission Timing Control>

When the information processing apparatus 1 receives the request packet from the mobile terminal 21 in the power saving mode, the information processing apparatus 1 recovers from the power saving mode to the normal mode, receives the data packet from the mobile terminal 21 and transmits the response packet. However, in the information processing apparatus 1, a certain amount of time is required to recover from the power saving mode to the normal mode as described above. When a data packet is received from the mobile terminal 21 before the information processing apparatus 1 recovers to the normal mode (before transition to the normal mode completes), there is the possibility that reception of the data packet and transmission of the response packet cannot be performed normally. Also, a case may occur in which even though a data packet can be received, transmission of a response packet cannot be performed at a timing in accordance with a communication setting included in a request packet, that is in which a delay arises in transmission of the response packet.

Accordingly, in the present embodiment, the timing at which transmission of the data packet to the information processing apparatus 1 by the BT communication from the mobile terminal 21 is initiated is controlled considering the time required for the information processing apparatus 1 to recover from the power saving mode to the normal mode. For example, if the information processing apparatus 1 is in the operational state of the power saving mode, the mobile terminal 21 delays the timing at which the transmission of the data packet is initiated more than the normal (predetermined) timing in cases where the information processing apparatus 1 is in the operational state of the normal mode. The information processing apparatus 1 notifies the operational state of the information processing apparatus 1 to the mobile terminal 21 by including state information indicating its operational state in a beacon packet (a beacon signal) and transmitting the beacon packet periodically. By such transmission timing control, it is possible to prevent a communication error from occurring due to the mobile terminal 21 being unable to receive a response packet which is in response to a data packet transmitted by the mobile terminal 21.

In the beacon packet (beacon signal) transmitted from the information processing apparatus 1 periodically, data indicating the type of the beacon packet, device information (user device name and identification information (ID information)), information for estimating the distance, or the like, is included. Furthermore, in the beacon packet, a region that can be used optionally is included. In the present embodiment, the information processing apparatus 1 includes the apparatus state information in this region in the beacon packet. Note that device information is one example of identification information for identifying the information processing apparatus 1, and the device information may be included in the region that can be used optionally in the beacon packet.

The state information of the apparatus is information indicating the apparatus operational state, and is information that indicates, for example, whether the information processing apparatus 1 is operating in the normal mode and is in a normal operational state (an active state), or is in a state other than the normal operational state (inactive state). The inactive state is, for example, an operational state in which the power consumption is less than in the active state (a state in which operation is in the power saving mode), or an error state in which an error has occurred on the information processing apparatus 1. The information processing apparatus 1 can notify such information to an external apparatus such as the mobile terminal 21 by including this kind of information in the beacon packet and transmitting the beacon packet.

Specifically, in the information processing apparatus 1, the CPU 6 determines the operational state of the information processing apparatus 1, and generates a beacon packet including state information indicating the determined operational state. Furthermore, the CPU 6 controls the BT communication unit 4 to transmit the generated beacon packet periodically by the BT communication. In the beacon packet, an apparatus state flag is included as the state information. For example, the apparatus state flag is set to a value indicating an active state in a case where the information processing apparatus 1 is in the normal mode. If the information processing apparatus 1 is in the power saving mode, the flag is set to a value indicating an inactive state.

In the mobile terminal 21, the CPU 26 instructs the BT communication unit 24 to initiate BT communication as described above when a data packet transmission request to the information processing apparatus 1 (BT communication request) occurs. The BT communication unit 24 detects a beacon packet transmitted from the information processing apparatus 1, from the signal received by the BT communication. When the beacon packet transmitted from the information processing apparatus 1 is detected by the BT communication unit 24, the CPU 26 controls the timing to initiate transmission of the data packet in accordance with the operational state of the information processing apparatus 1 which the state information included in the detected beacon packet indicates.

For example, if the state information included in the detected beacon packet indicates an active state (a first state), the CPU 26 controls the BT communication unit 24 to initiate transmission of the data packet at a predetermined timing. Meanwhile, if the state information indicates the inactive state (a second state different from the first state), the CPU 26 controls the BT communication unit 24 to delay, more than a predetermined timing, the timing at which to initiate data packet transmission. The CPU 26 causes the transmission initiation timing of such a data packet to be reflected in the communication setting included in the request packet.

By control as described above, even if the request packet is received in the inactive state in the information processing apparatus 1, it is possible to transmit the response packet at a timing in accordance with the communication setting included in the request packet after transition to the active state has completed. Meanwhile, in the mobile terminal 21, it becomes possible to receive the response packet from the information processing apparatus 1 at a timing according to the communication setting included in the request packet. Specifically, the information processing apparatus 1 can prevent a communication error from occurring due to the mobile terminal 21 being unable to receive a response packet which is in response to a data packet transmitted by the mobile terminal 21. Below, explanation is given for a more specific example of operation in the information processing apparatus 1 and the mobile terminal 21.

Information Processing Apparatus Operation Example

In the information processing apparatus 1, when the CPU 6 causes the information processing apparatus 1 to transition from the normal mode to the power saving mode, the CPU 6 changes the apparatus state flag to a value indicating the inactive state. Furthermore, the CPU 6 rewrites data of the beacon packet provided to the BT communication unit 4 in order that the BT communication unit 4 transmits a beacon packet including the apparatus state flag after the change. Thereafter, the BT communication unit 4 periodically transmits the beacon packet in which the apparatus state flag is changed. Note that in the power saving mode the CPU 6, the wireless LAN communication unit 3, and the BT communication unit 4 continue to operate.

When a condition for recovering from the power saving mode to the normal mode is satisfied (for example, reception of an operation of the operation input unit 2b by a user, or a connection request from the external apparatus), the CPU 6 resumes the power supply to necessary devices from the power source. After that, the CPU 6 initiates operation in the normal mode by reading the program 12 stored in the storage device 8 and executing the program 12, and when operation in the normal mode becomes possible upon completing initialization of each device, the CPU 6 causes an operation screen to be displayed on the display unit 2a. Note that if, for example, the storage device 8 is configured by the HDD, disk spin-up time, or the like, is needed. For this reason, a certain amount of time is required from when the condition for recovering to the normal mode is satisfied to when operation in the normal mode becomes possible (specifically, transition to the normal mode completes).

When transition from the power saving mode to the normal mode completes, the CPU 6 changes the apparatus state flag to a value indicating the active state. Furthermore, the CPU 6 rewrites data of the beacon packet provided to the BT communication unit 4 in order that the BT communication unit 4 transmits a beacon packet including the apparatus state flag after the change. Thereafter, the BT communication unit 4 periodically transmits the beacon packet in which the apparatus state flag is changed.

Figure 6:
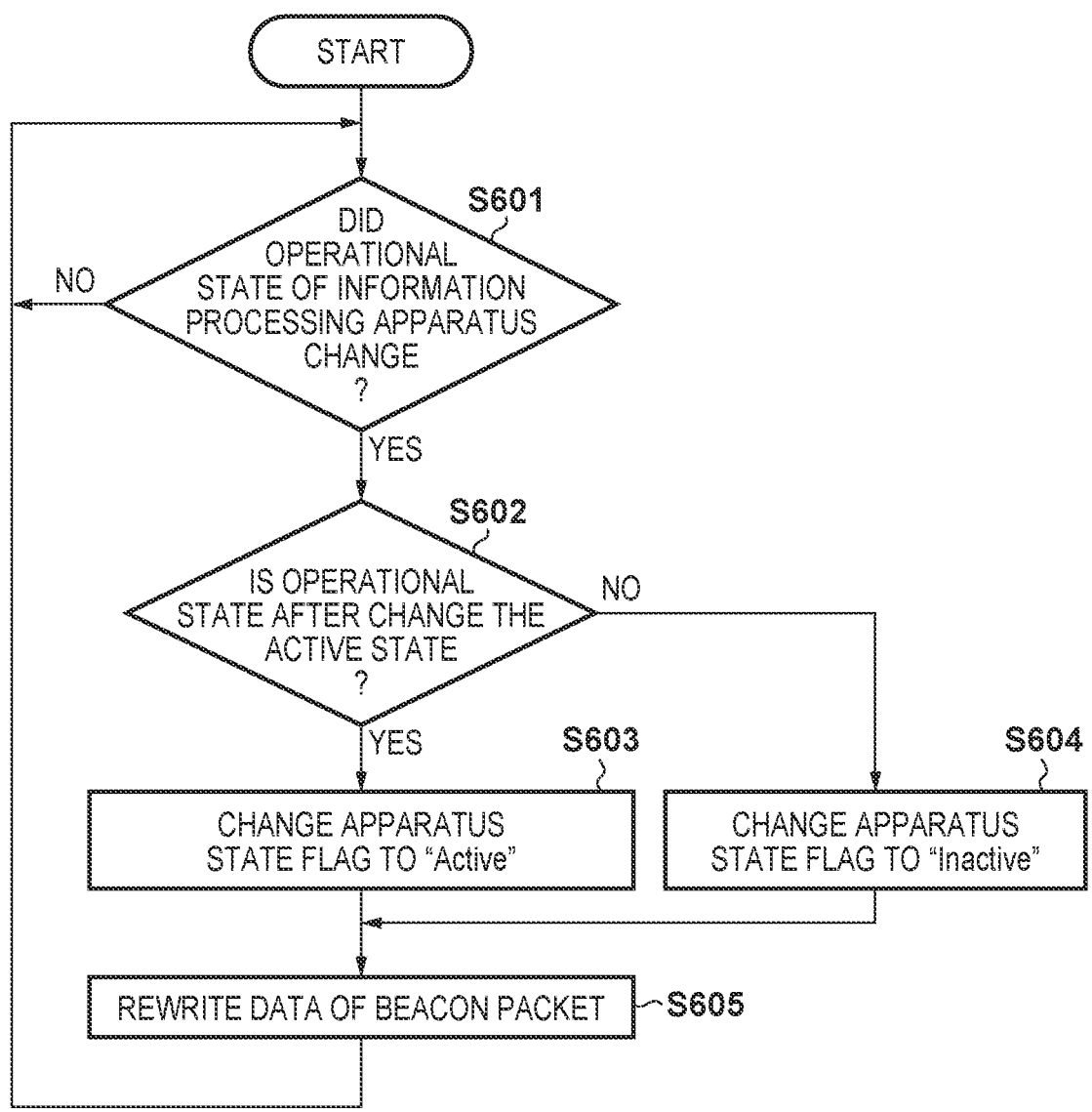
FIG. 6 is a flowchart for illustrating an example of an operation procedure in the information processing apparatus.

FIG. 6 is a flowchart for illustrating an example of an operation procedure in the information processing apparatus 1 as described above. Note that, the processing of each step illustrated in FIG. 6 is realized in the information processing apparatus 1, by the CPU 6, reading and executing the program 12 from the storage device 8. When the power source switches to an on state from an off state, the information processing apparatus 1 continues to execute the following processing until it switches to the off state.

The CPU 6 monitors the operational state of the information processing apparatus 1 and determines the operational state periodically. In step S601, the CPU 6 determines whether or not the operational state of the information processing apparatus 1 changed, and when the CPU 6 determines that the operational state changed, the CPU 6 advances the processing to step S602. Note that the operational state of the apparatus is the active state (corresponding to the normal mode) or the inactive state (corresponding to the power saving mode) as described above. The CPU 6, as described above, determines that the operational state of the apparatus changed when the operation mode changes from the power saving mode to the normal mode or from the normal mode to the power saving mode. Note that, if an error occurred in the active state, the CPU 6 may determine that the operational state changed to the inactive state.

In step S602, the CPU 6 determines whether or not the operational state of the information processing apparatus 1 after the change is the active state, and if the operational state is the active state, the CPU 6 advances the processing to step S603; if the operational state is not the active state (it is the inactive state), the CPU 6 advances the processing to step S604.

In step S603, the CPU 6 changes the apparatus state flag to a value indicating the active state ("Active"). On the other hand, in step S604, the CPU 6 changes the apparatus state flag to a value indicating the inactive state ("Inactive"). After the processing in step S603 or step S604, the CPU 6 advances processing to step S605. Note that in step S603 or in step S604 the change in the state of the apparatus may be notified to the BT communication unit 4.

In step S605, the CPU 6 generates a new beacon packet by rewriting data of the beacon packet provided to the BT communication unit 4 to include the apparatus state flag after the change. As a result, the BT communication unit 4 transmits a beacon packet including the apparatus state flag after the change periodically thereafter. The CPU 6 repetitively executes the foregoing operation until the power source of the information processing apparatus 1 switches to the off state.

Mobile Terminal Operation Example 1

Figure 7:
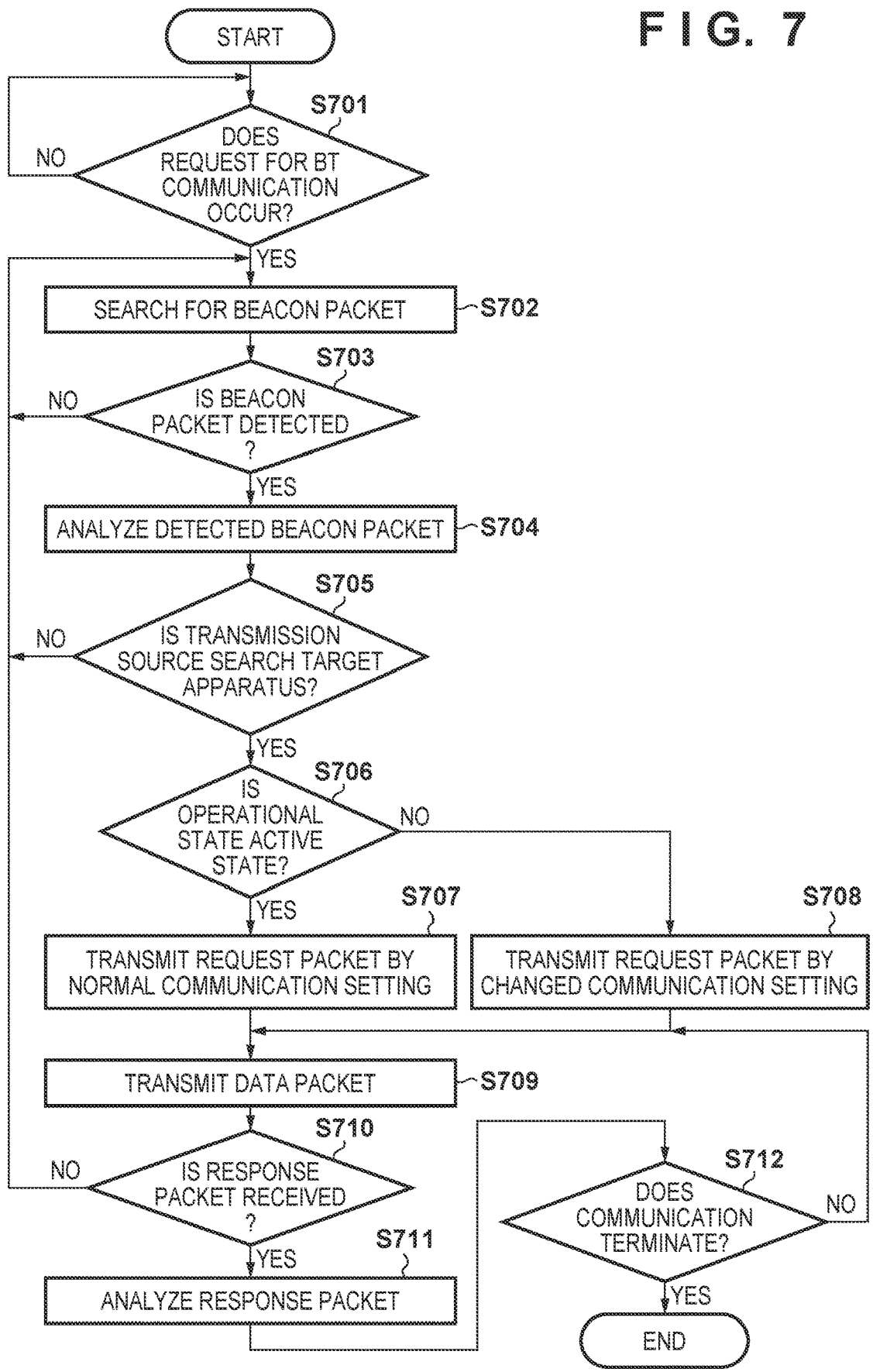
FIG. 7 is a flowchart for illustrating an example of an operation procedure in the mobile terminal.

FIG. 7 is a flowchart illustrating an example (operation example 1) of an operation procedure in the mobile terminal 21. Note that, the processing of each step illustrated in FIG. 7 is realized in the mobile terminal 21 by the CPU 26 reading and executing a program from the storage device 28. The mobile terminal 21 executes the following processing when a request for BT communication with the information processing apparatus 1 (that is, a request to transmit a data packet to the information processing apparatus 1) occurs in accordance with operating application software.

In step S701, the CPU 26 determines whether or not a request for a BT communication with the information processing apparatus 1 occurs in accordance with application software operating on the mobile terminal 21. The CPU 26 advances the processing to step S702 if the request for BT communication occurs, and waits until a request for BT communication does occur if no such request has occurred.

The processing in steps S702-S704 is executed by the BT communication unit 24 in accordance with control by the CPU 26. The BT communication unit 24, in step S702, searches for a beacon packet from signals (packets) received by the BT communication, and determines whether or not a beacon packet is detected in step S703. The CPU 26 continues searching (step S702) for a beacon packet as long as a beacon packet is not detected by the BT communication unit 24, and when a beacon packet is detected, the CPU 26 advances the processing to step S704.

In step S704, the BT communication unit 24 analyzes the detected beacon packet, and further analyzes data extracted therefrom. In step S705, the BT communication unit 24 determines whether or not the transmission source apparatus of the beacon packet is a search target apparatus (that is, the information processing apparatus 1) based on the data extracted from the beacon packet. Specifically, the BT communication unit 24 confirms whether or not the device information included in the beacon packet (the user device name and ID information) indicates the search target apparatus. If it is determined by the BT communication unit 24 that the beacon packet transmission source apparatus is the search target apparatus, the CPU 26 advances the processing to step S706, and if it is determined that the transmission source is not the search target apparatus, the CPU 26 returns the processing to step S702. Note that data extracted from the received beacon packet is outputted from the BT communication unit 24 to the CPU 26.

In step S706, the CPU 26 determines whether or not the operational state of the search target apparatus (that is, the information processing apparatus 1) is the active state based on the apparatus state flag (state information) extracted from the received beacon packet. The CPU 26 advances the processing to step S707 and to step S708 respectively when the CPU 26 determines that the operational state of the information processing apparatus 1 is the active state and when the CPU 26 determines that the operational state is not the active state (it is the inactive state).

In step S707, the CPU 26 controls the BT communication unit 24 to transmit a request packet (a connection request) to the information processing apparatus 1, which is a transmission destination of the data packet, by a normal communication setting. In the request packet, as described above, information indicating the transmit-window-offset 51 and the transmit-window-size 52 are included as the communication setting. The transmit-window-offset 51 corresponds to an interval from when the request packet is transmitted to when the transmission of the data packet is initiated (a first interval). Also, the transmit-window-size 52 corresponds to an interval during which the data packet that is first transmitted after the request packet can be transmitted (a second interval).

After step S707, the CPU 26, in step S709, causes the BT communication unit 4 to transmit the data packet at a timing according to the communication setting included in the request packet (the transmit-window-offset 51 and the transmit-window-size 52). The BT communication unit 4 initiates the transmission of the data packet at a timing (a predetermined timing) defined by the transmit-window-offset 51. Thereafter, the CPU 26 advances the processing to step S710.

Meanwhile, in step S708, the CPU 26 controls the BT communication unit 24 to transmit a request packet (a connection request) to the information processing apparatus 1, which is the transmission destination of the data packet, by a communication setting changed from the normal communication setting. The communication setting in this case, corresponds to a setting for delaying the timing to initiate the transmission of the data packet more than a predetermined timing. Specifically, the CPU 26 changes the transmit-window-offset 51 to a larger value, and by including the set value in the request packet as the communication setting, notifies the set value to the information processing apparatus 1. In this way, the transmit-window-offset 51 is set to a larger value in a case where the apparatus state flag indicates the inactive state (corresponding to a longer interval) than in a case where the apparatus state flag indicates the active state.

After step S708, the CPU 26, in step S709, causes the BT communication unit 24 to transmit the data packet at a timing according to the changed communication setting included in the request packet. The BT communication unit 4 initiates the transmission of the data packet at a timing defined by the transmit-window-offset 51 which is changed in step S708. Thereafter, the CPU 26 advances the processing to step S710.

In the information processing apparatus 1, the BT communication unit 4 transmits the response packet (a response) to the data packet when the BT communication unit 4 receives the data packet via the link established with the BT communication unit 24 by the reception of the request packet. The BT communication unit 4 transmits to the mobile terminal 21 a response packet in response to the data packet received from the mobile terminal 21 at a timing according to the communication setting included in the request packet. Specifically, the response packet is transmitted at a timing determined by the transmit-window-offset 51 and the transmit-window-size 52 included as the communication setting in the request packet.

In this way, the time that the information processing apparatus 1 requires to recover from the inactive state to the active state is considered in the transmission timing of the response packet in response to the data packet. The information processing apparatus 1 is enabled to transmit the response packet after recovering from the inactive state to the active state, at a timing according to the communication setting included in the request packet.

In step S710, the CPU 26 determines whether or not the response packet is received from the information processing apparatus 1 by the BT communication unit 4 at a timing according to the above described communication setting. If the CPU 26 determines that the response packet is not received, the CPU 26 determines that a link with the information processing apparatus 1 could not be established, and returns the processing to step S702 to perform the search for the beacon packet once again. Meanwhile, if the CPU 26 determines that the response packet is received, the CPU 26 determines that the link with the information processing apparatus 1 could be established, and advances the processing to step S711.

In step S711, the CPU 26 obtains necessary information by analyzing the response packet received in step S710. Furthermore, the CPU 26, in step S712, determines whether or not to terminate the BT communication with the information processing apparatus 1, and if the CPU 26 determines to terminate the BT communication, the CPU 26 ends the processing; if the CPU 26 determines not to terminate the BT communication (the data packet to be transmitted is left), the CPU 26 returns the processing to step S709. In step S709, the CPU 26 causes the BT communication unit 24 to transmit the next the data packet to the information processing apparatus 1.

As explained above, in the present embodiment, the mobile terminal 21 controls the timing at which the transmission of the data packet to the information processing apparatus 1 is initiated, in accordance with the operational state of the information processing apparatus 1 which the device information included in the beacon packet received from the information processing apparatus 1 indicates. With this, the information processing apparatus 1 is enabled to transmit a response (a response packet) to a data packet received from the mobile terminal 21 in a state that considers the time required for recovering from the power saving mode, for example. Accordingly, by virtue of the present embodiment, it is possible to prevent the occurrence of a communication error in a case where a delay occurs in a response (the response packet) to a request packet from the mobile terminal 21 depending on the operational state of the information processing apparatus 1. Also, in the mobile terminal 21, a communication error, redoing of a search for a beacon packet, or the like, due to being unable to receive a response packet, cease to occur, and it is also possible to avoid a pop-up display caused by a communication error.

Also, in the information processing apparatus 1, if there is a possibility that a delay will occur in a response to a request packet (a connection request) from the mobile terminal 21, the apparatus state flag is changed as in the processing of step S604, and data of the beacon packet is changed. In the present embodiment, by this kind of simple processing, it is possible to prevent a communication error as described above from occurring due to a delay in a response depending on time being required to recover from the inactive state to the active state.

Mobile Terminal Operation Example 2

Figure 8:
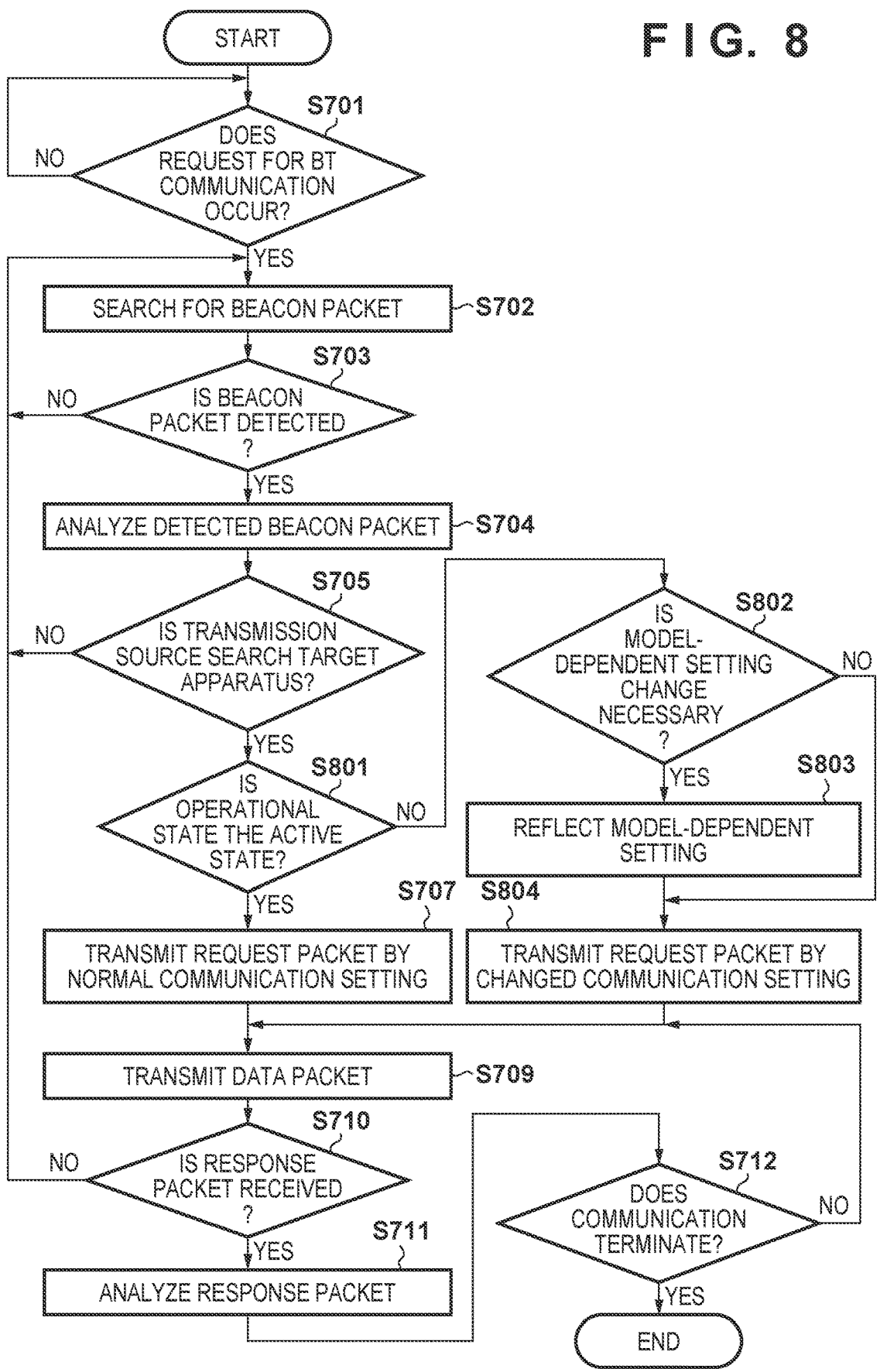
FIG. 8 is a flowchart for illustrating an example of an operation procedure in the mobile terminal.

Next, explanation is given for another operation example in the mobile terminal 21. FIG. 8 is a flowchart illustrating an example (operation example 2) of a procedure of operation in the mobile terminal 21. Note that, the processing of each step illustrated in FIG. 8 is realized in the mobile terminal 21 by the CPU 26 reading and executing the program from the storage device 28. The mobile terminal 21 executes the following processing when a request for BT communication with the information processing apparatus 1 (that is, a request to transmit a data packet to the information processing apparatus 1) occurs in accordance with operating application software. Additionally, explanation of processing common to the foregoing operation example 1 will be omitted below.

The processing of steps S701-S705 is similar to that of the operation example 1 (FIG. 7). In step S705, if it is determined that the apparatus that is the transmission source of the received beacon packet is a search target apparatus (specifically, the information processing apparatus 1), the CPU 26 advances the processing to step S801.

In step S801, the CPU 26 determines whether or not the operational state of the search target apparatus (that is, the information processing apparatus 1) is the active state based on the apparatus state flag (the state information) extracted from the received beacon packet, similarly to in step S706 (FIG. 7). In the operation example 2, the CPU 26 advances the processing to step S707 and to step S802 respectively when the CPU 26 determines that the operational state of the information processing apparatus 1 is the active state and when the CPU 26 determines that the operational state is not the active state (it is the inactive state).

In step S802, the CPU 26 first reads out the model-dependent information held in a state stored in the storage device 28 by operating application software. The model-dependent information is information that indicates a data packet transmission initiation timing in association with each of a plurality of information processing apparatuses, which is used in a case where the respective information processing apparatuses are in the inactive state (a second state). The CPU 26 initiates transmission of the data packet at the transmission initiation timing associated with the information processing apparatus (that is, the information processing apparatus 1) identified by the device information (identification information) included in the received beacon packet, based on the read model-dependent information.

In this way, the data packet transmission initiation timing is controlled for each information processing apparatus because the time required for recovering from the power saving mode (recovery time) may differ for each information processing apparatus. For example, the recovery time differs depending on whether the information processing apparatus is using an HDD as a storage device or the information processing apparatus is using an SSD (Solid State Drive) as a storage device. In the operation example 2, such a discrepancy in the recovery time is reflected in the control of the data packet transmission initiation timing.

Specifically, in step S802, the CPU 26 determines, based on the model-dependent information that is read, whether or not a model-dependent setting change is necessary for the communication setting included in the request packet. For example, if the transmission initiation timing associated with the information processing apparatus is not stored in the storage device 28, the CPU 26 determines that the model-dependent setting change is not necessary, and advances the processing to step S804. In remaining cases, the CPU 26 advances the processing to step S803. In step S803, the CPU 26 reflects the transmission initiation timing associated with the information processing apparatus 1, which is stored in the storage device 28, in the communication setting included in the request packet.

After that, the CPU 26, in step S804, similarly to in step S708 (FIG. 7) controls the BT communication unit 24 to transmit a request packet (a connection request) to the information processing apparatus 1 which is the data packet transmission destination by a communication setting change from the normal communication setting. Thereafter, the CPU 26 advances the processing to step S709. The processing of steps S709-S712 is similar to that of the operation example 1 (FIG. 7).

By virtue of the operation example illustrated in FIG. 8, similarly to in the operation example 1, it is possible to prevent the occurrence of a communication error in a case where a delay occurs in a response (the response packet) to a request packet from the mobile terminal 21 depending on the operational state of the information processing apparatus 1. Furthermore, it is possible to appropriately control the timing of initiation of data packet transmission from the mobile terminal 21 to the information processing apparatus, according to the capabilities of the transmission destination apparatus.

Mobile Terminal Operation Example 3

Figure 9:
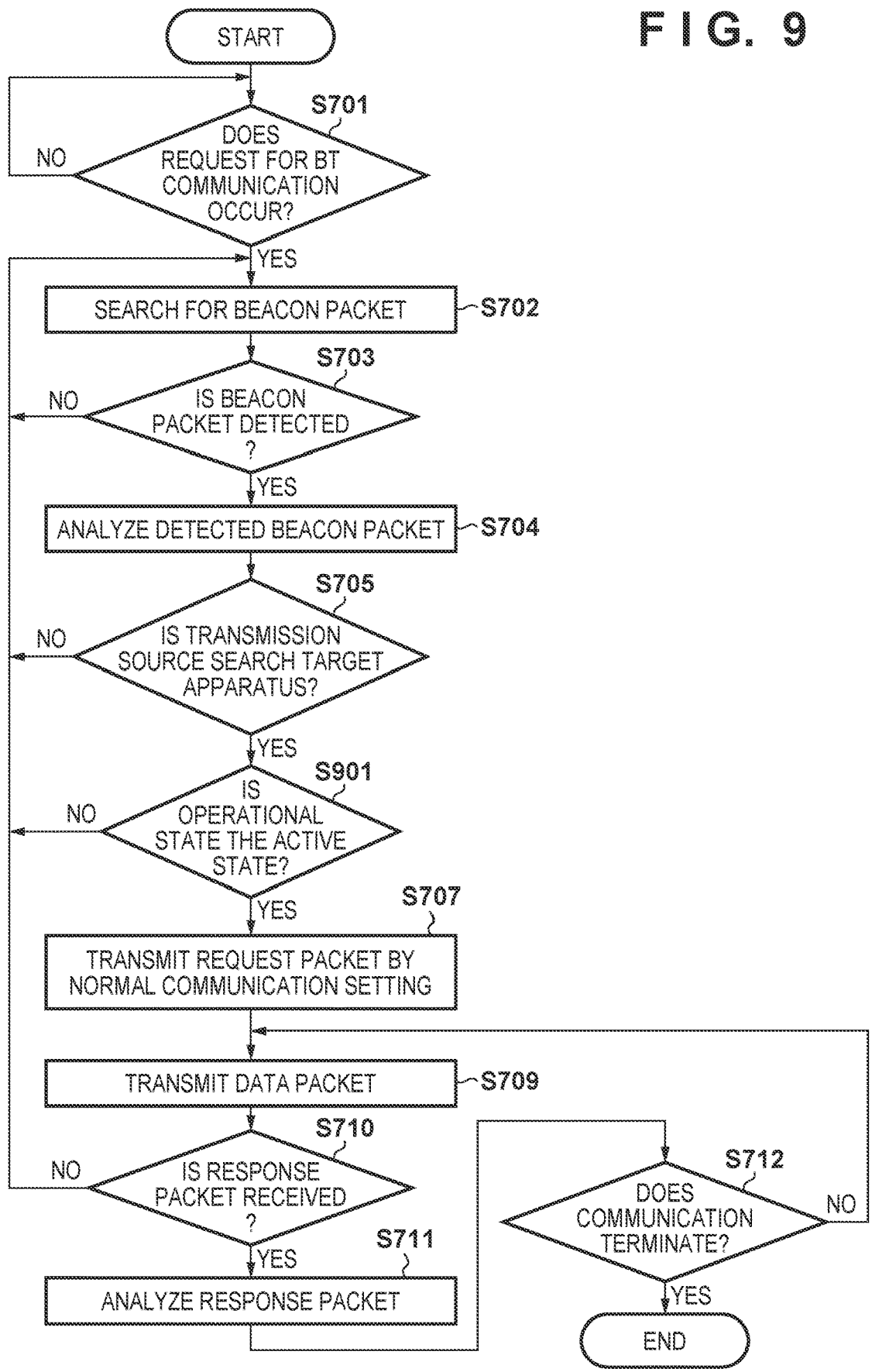
FIG. 9 is a flowchart for illustrating an example of an operation procedure in the mobile terminal.

Next, explanation is given for yet another operation example in the mobile terminal 21. FIG. 9 is a flowchart illustrating an example (operation example 3) of a procedure of operation in the mobile terminal 21. Note that, the processing of each step illustrated in FIG. 9 is realized in the mobile terminal 21 by the CPU 26 reading the program from the storage device 28 and executing the program. The mobile terminal 21 executes the following processing when a request for BT communication with the information processing apparatus 1 (that is, a request to transmit a data packet to the information processing apparatus 1) occurs in accordance with operating application software. Additionally, explanation of processing common to the foregoing operation example 1 will be omitted below.

The processing of steps S701-S705 is similar to that of the operation example 1 (FIG. 7). In step S705, if it is determined that the apparatus that is the transmission source of the received beacon packet is a search target apparatus (specifically, the information processing apparatus 1), the CPU 26 advances the processing to step S901.

In step S901, the CPU 26 determines whether or not the operational state of the search target apparatus (that is, the information processing apparatus 1) is the active state based on the apparatus state flag (the state information) extracted from the received beacon packet, similarly to in step S706 (FIG. 7). In the operation example 3, the CPU 26 advances the processing to step S707 when the CPU 26 determines that the operational state of the information processing apparatus 1 is the active state and returns the processing to step S702 when the CPU 26 determines that the operational state is not the active state (it is the inactive state).

In this way, in the operation example 3, the CPU 26 delays the timing for initiating transmission of the data packet until the CPU 26 detects a beacon packet including state information indicating the active state if the operational state of the information processing apparatus 1 is the inactive state. After this, the CPU 26 advances process to step S707 if the CPU 26 detects a beacon packet including state information indicating the active state ("YES" in step S901). In step S707, the BT communication unit 24 is controlled to transmit a request packet (a connection request) to the information processing apparatus 1, which is a transmission destination of the data packet, by a normal communication setting. Thereafter, the CPU 26 advances the processing to step S709. The processing of steps S709-S712 is similar to that of the operation example 1 (FIG. 7).

Accordingly, by virtue of the operation example illustrated in FIG. 9, similarly to in the operation example 1, it is possible to prevent the occurrence of a communication error in a case where a delay occurs in a response (the response packet) to a request packet from the mobile terminal 21 depending on the operational state of the information processing apparatus 1.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-027940, filed Feb. 16, 2015, which is hereby incorporated by reference herein in its entirety.

What is claimed is:
1. A communication system, comprising:
a first communication apparatus comprising a first wireless communicator configured to perform wireless communication in accordance with a Bluetooth standard; and
a second communication apparatus comprising a second wireless communicator configured to perform wireless communication in accordance with the Bluetooth standard,
wherein the first communication apparatus can operate in one of a plurality of states including a first state and a second state, the first state being a state in which the first communication apparatus can respond to a connection request packet received by the first wireless communicator, and the second state being a state in which the first communication apparatus shifts to the first state in response to the first wireless communicator receiving the connection request packet,
wherein the first communication apparatus includes at least one controller configured to:
wirelessly transmit, by the first wireless communicator, a first advertisement packet in a case where the first communication apparatus is in the first state, and a second advertisement packet that includes information different from information included in the first advertisement packet in a case where the first communication apparatus is in the second state, and
wherein the second communication apparatus includes at least one controller configured to:
wirelessly receive, by the second wireless communicator, the first advertisement packet or the second advertisement packet transmitted from the first communication apparatus;
wirelessly transmit, by the second wireless communicator, a connection request packet as a response to the received advertisement packet; and
wirelessly transmit, by the second wireless communicator, a data packet subsequent to transmission of the connection request packet, wherein an elapsed time from when the connection request packet is transmitted as a response to the second advertisement packet to when transmission of the data packet is initiated is larger than an elapsed time from when the connection request packet is transmitted as a response to the first advertisement packet to when transmission of the data packet is initiated.
2. The communication system according to claim 1, wherein the at least one controller of the second communication apparatus is configured to:
set, based on information in the received advertisement packet from the first communication apparatus, a time parameter which corresponds to a transmit-window-offset of the Bluetooth standard and which is included in the connection request packet of the Bluetooth standard, and wirelessly transmit, by the second wireless communicator, the connection request packet including the set time parameter, to the first communication apparatus as a response to the received advertisement packet from the first communication apparatus.

3. The communication system according to claim 2, wherein
the at least one controller of the second communication apparatus is configured to set, as the time parameter, a time having a different length for each of a case where the information included in the received advertisement packet from the first communication apparatus is a first content and a case where the information included in the received advertisement packet from the first communication apparatus is a second content.

4. The communication system according to claim 2, wherein
the at least one controller of the second communication apparatus is configured to transmit, by the second wireless communicator, a first data packet to the first communication apparatus after a time corresponding to the time parameter included in the connection request packet elapses from when the connection request packet was transmitted.

5. The communication system according to claim 4, wherein
the at least one controller of the second communication apparatus is configured to not transmit, by the second wireless communicator, any data packet to the first communication apparatus during a period from when the connection request packet is transmitted to the first communication apparatus until when the first data packet is transmitted to the first communication apparatus.

6. The communication system according to claim 2, wherein the transmit-window-offset of the Bluetooth standard notifies the first communication apparatus of when the first data packet is to be transmitted to the first communication apparatus after the connection request packet is transmitted.

7. The communication system according to claim 2, wherein the time parameter set when the first advertisement packet is received is different from the time parameter set when the second advertisement packet is received.

8. The communication system according to claim 2, wherein the connection request packet of the Bluetooth standard includes both the time parameter corresponding to the transmit-window-offset of the Bluetooth and also another time parameter corresponding to a transmit-window-size of the Bluetooth.

9. The communication system according to claim 1, wherein
the at least one controller of the first communication apparatus is configured to transmit, by the first wireless communicator, the first advertisement packet and the second advertisement packet repeatedly and periodically.

10. The communication system according to claim 1, wherein
the information included in the first advertisement packet and in the second advertisement packet is information that indicates an operational state of the first communication apparatus.

11. The communication system according to claim 1, wherein
the first state is an operational state where power is supplied to part of the first communication apparatus and the second state is an operational state where power is not supplied to the part of the first communication apparatus.

12. The communication system according to claim 1, wherein
the first communication apparatus is able to respond to a first data packet transmitted from the second communication apparatus in the first state, and is unable to respond to a first data packet transmitted from the second communication apparatus in the second state.

13. The communication system according to claim 1, wherein
the Bluetooth standard includes a Bluetooth Low Energy standard.

14. The communication system according to claim 1, wherein the connection request packet of the Bluetooth standard is a packet which is transmitted, as a response to the received advertisement packet of the Bluetooth standard, to establish a connection of the Bluetooth standard between the first communication apparatus and the second communication apparatus.

15. A method for controlling a communication system that comprising a first communication apparatus that includes a first wireless communicator configured to perform wireless communication in accordance with a Bluetooth standard, and a second communication apparatus that includes a second wireless communicator configured to perform wireless communication in accordance with the Bluetooth standard,
wherein the first communication apparatus can operate in one of a plurality of states including a first state and a second state, the first state being a state in which the first communication apparatus can respond to a connection request packet received by the first wireless communicator, and the second state being a state in which the first communication apparatus shifts to the first state in response to the first wireless communicator receiving the connection request packet, the method comprising:
wirelessly transmitting, by the first wireless communicator, a first advertisement packet in a case where the first communication apparatus is in the first state, and a second advertisement packet that includes information different from information included in the first advertisement packet in a case where the first communication apparatus is in the second state;
wirelessly receiving, by the second wireless communicator, the first advertisement packet or the second advertisement packet transmitted from the first communication apparatus;
wirelessly transmitting, by the second wireless communicator, a connection request packet as a response to the received advertisement packet; and
wirelessly transmitting, by the second wireless communicator, a data packet subsequent to transmission of the connection request packet, wherein an elapsed time from when the connection request packet is transmitted as a response to the second advertisement packet to when transmission of the data packet is initiated is larger than an elapsed time from when the connection request packet is transmitted as a response to the first advertisement packet to when transmission of the data packet is initiated.

16. The method according to claim 15, further comprising:
setting by the second communication apparatus, based on information in the received advertisement packet from the first communication apparatus, a time parameter which corresponds to a transmit-window-offset of the Bluetooth standard and which is included in the connection request packet of the Bluetooth standard, and
wirelessly transmitting by the second communication apparatus, using the second wireless communicator, the connection request packet including the set time parameter, to the first communication apparatus as a response to the received advertisement packet from the first communication apparatus.

17. The method according to claim 16, wherein
the setting of the time parameter by the second communication apparatus comprises setting, as the time parameter, a time having a different length for each of a case where the information included in the advertisement packet received from the first communication apparatus is a first content and a case where the information included in the advertisement packet received from the first communication apparatus is a second content.

18. The method according to claim 16, wherein
the transmitting a data packet by the second wireless communicator comprises transmitting, by the second wireless communicator, a first data packet to the first communication apparatus after a time corresponding to the time parameter included in the connection request packet elapses from when the connection request packet was transmitted.

19. The method according to claim 18, wherein
the second communication apparatus does not transmit, by the second wireless communicator, any data packet to the first communication apparatus during a period from when the connection request packet is transmitted to the first communication apparatus until when the first data packet is transmitted to the first communication apparatus.

20. The method according to claim 16, wherein the transmit-window-offset of the Bluetooth standard notifies the first communication apparatus of when the first data packet is to be transmitted to the first communication apparatus after the connection request packet is transmitted.

21. The method according to claim 16, wherein the time parameter set when the first advertisement packet is received is different from the time parameter set when the second advertisement packet is received.

22. The method according to claim 16, wherein the connection request packet of the Bluetooth standard includes both the time parameter corresponding to the transmit-window-offset of the Bluetooth and also another time parameter corresponding to a transmit-window-size of the Bluetooth.

23. The method according to claim 15, wherein
the first communication apparatus transmits, by the first wireless communicator, the first advertisement packet and the second advertisement packet repeatedly and periodically.

24. The method according to claim 15, wherein
the information included in the first advertisement packet and in the second advertisement packet is information that indicates an operational state of the first communication apparatus.

25. The method according to claim 15, wherein
the first state is an operational state where power is supplied to part of the first communication apparatus and the second state is an operational state where power is not supplied to the part of the first communication apparatus.

26. The method according to claim 15, wherein
the first communication apparatus is able to respond to a first data packet transmitted from the second communication apparatus in the first state, and is unable to respond to a first data packet transmitted from the second communication apparatus in the second state.

27. The method according to claim 15, wherein
the Bluetooth standard includes a Bluetooth Low Energy standard.

28. The method according to claim 15, wherein the connection request packet of the Bluetooth standard is a packet which is transmitted, as a response to the received advertisement packet of the Bluetooth standard, to establish a connection of the Bluetooth standard between the first communication apparatus and the second communication apparatus.

* * * * *